E. V. WHITE.
EARPIECE FOR EYEGLASSES.
APPLICATION FILED NOV. 23, 1912.
1,069,833.
Patented Aug. 12, 1913.
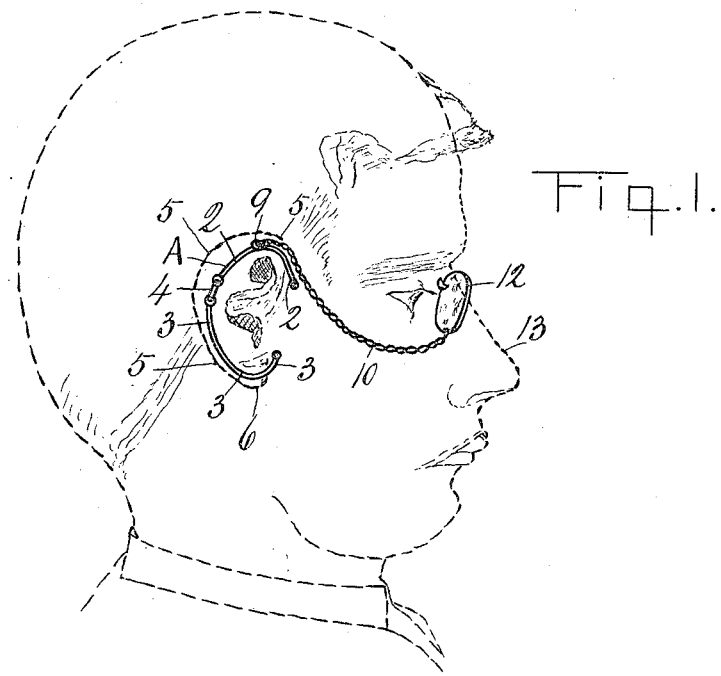
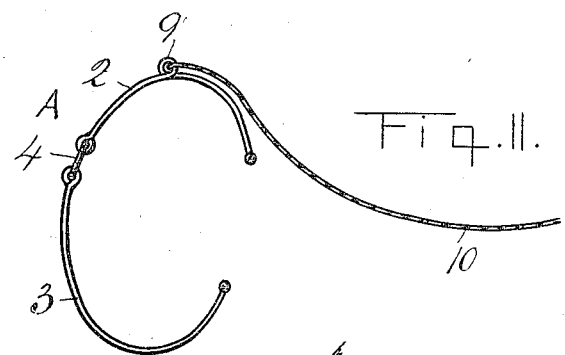
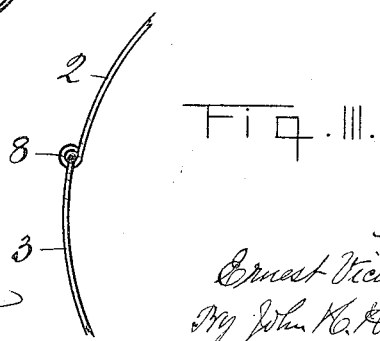

UNITED STATES PATENT OFFICE.

ERNEST VICTOR WHITE, OF WELLAND, ONTARIO, CANADA.

EARPIECE FOR EYEGLASSES.

1,069,833. Specification of Letters Patent. Patented Aug. 12, 1913.

Application filed November 23, 1912. Serial No. 733,108.

*To all whom it may concern:*

Be it known that I, ERNEST VICTOR WHITE, a subject of the King of Great Britain, and resident of Welland, in the county of Welland and Province of Ontario, Canada, have invented new and useful Improvements in Earpieces for Eyeglasses, of which the following is a specification.

My invention relates to an improvement in ear pieces for eye glasses.

The objects of my invention are, first, to provide an improved ear piece, in jointed members or parts, adapted to be readily adjusted to the ear and to allow a desirable and pleasant contact of the ear piece when the eye glasses attached thereto are adjusted to position; and second, to provide means, whereby the members of the ear piece securely engage the ear when the upper member of the ear piece is tensioned by means of the usual chain, cord, or other fastening connecting the ear piece to the eye glasses.

The invention consists of an ear piece composed of upper and lower sections, pivotally jointed together, and means on the upper part of the upper section for the attachment of an eye glass cord, chain, or other flexible fastening.

In the accompanying drawings: Figure 1 is an elevation of the hinged ear piece, in position attached to an eye glass, by means of a chain, all of which are in position on the broken outlines of a person. Fig. 2 is an enlarged elevation of the hinged ear piece with an eye glass chain, or cord, attached to the upper member thereof, said cord being broken. Fig. 3 is an enlarged elevation of the hinged connection of the members of the ear piece, which are shown broken a distance from said hinge.

Similar characters of reference refer to similar parts throughout the several views.

In the drawing, A is the hinged ear piece comprising an upper member 2, and a lower member 3, of suitable material and preferably of steel, or resilient wire, and of suitable size and shape. In Figs. 1 and 2 of the drawing, the members 2 and 3, are shown hinged together by means of a link 4, and in Fig. 3 of the drawing said members are shown hinged together by direct hinge connection one to the other, as at 8. Various ways and means may be employed for hinging the members together, and at the parts immediately behind the ear. The ear is indicated by 5, and the lobe portion thereof by 6, in broken lines, in order to show the ear piece in position, and in full lines.

The upper part of the member 2, has an eyelet 9, and one end of the chain 10 is securely attached thereto, the opposite end of the chain is securely attached to an end part of the eyeglasses 12, in the usual manner, said eye glasses rest on the nose 13, of a person, and shown in broken lines. Should the chain be pulled taut, the tendency of the member 3, is to hug the lower portion of the ear, and more especially the lobe portion, and the greater strain or tension brought upon the chain the more firmly and effective is the grip of the member 3, to the ear, yet without the least inconvenience to the wearer. This light but secure clamping action of the members 2 and 3 results from the location of the eyelet 9 on the upper part of the section 2, preferably substantially at the crest thereof.

The ear piece being hinged, as shown, is superior and effective for the purpose of holding or retaining eye glasses in position, and also when the eye glasses are removed from position, or hanging on the ear by means of the ear piece and chain.

The important feature and element in this invention is the members which comprise the ear piece proper, being hinged or pivotally connected together, in order that the said members may find a substantial and somewhat equalized bearing or lodgment behind the ear, and the location of the chain or cord attaching device 9 at the upper part of the upper member 2. By the fact of the members being hinged, or loosely connected together, the hinge allows the balled ends of the ear piece to be brought closer together by the tensioning of the chain, thereby causing the ear piece to adhere the more closely and efficiently to the ear, without inconveniencing the wearer.

It is possible to make the ear piece comprised of more members than shown and described, and hinged or pivotally connected one to the other, or connected together by means of one or more links 4, but I prefer two members hinged, or linked, one to the other. The hinge and link referred to can be constructed without the same irritating or unpleasantly affecting the ear. Formerly ear pieces have been composed of one piece, and experience has proved that they frequently break, on account of the weakening of the ear piece by frequently adjusting the same. On account of the construction of the invention in parts, the tendency of breakage of the same is largely eliminated.

What I claim as my invention and desire to secure by Letters Patent, is:—

1. An ear piece for eye glasses, composed of upper and lower curved members pivotally jointed together, and means located on the upper part of the upper member adapted for the attachment of an eye glass cord or other fastening.

2. An ear piece for eye glasses, composed of upper and lower curved members pivotally jointed together, the upper member being formed into an eyelet which is located substantially at the crest of said upper member.

ERNEST VICTOR WHITE.

Witnesses:
 JOHN H. HENDRY,
 RICHARD BUTLER.

Copies of this patent may be obtained for five cents each, by addressing the "Commissioner of Patents, Washington, D. C."